3,166,604
PROCESS FOR THE PRODUCTION OF 1,2,4-TRIETHYLBENZENE
Fritz Derichs, Otto Glosauer, Rudolf Muller, Wolfgang Schade, and Walter Franke, all of Marl, Kreis Recklinghausen, Germany, assignors to Chemische Werke Hüls Aktiengesellschaft, Marl, Kreis Recklinghausen, Germany, a corporation of Germany
No Drawing. Filed Jan. 8, 1962, Ser. No. 165,014
Claims priority, application Germany, Mar. 1, 1961, C 23,538
8 Claims. (Cl. 260—668)

It is known to isomerize mono and diolefines by treatment with alkali metals in such a way that an end double bond is moved into the middle of the molecule (see U.S. Patent No. 2,804,489).

It is further known that vinylcyclohexene can be converted into ethylbenzene by the action of lithium in the presence of ethylenediamine (see J. Org. Chem., 23, 1136 (1958)).

Cycloaliphatic compounds having several olefinic side chains would not however be subjected to this reaction because it would be expected that under the reaction conditions dimeric and polymeric products would be formed and that no aromatization would occur.

It has now been found that 1,2,4-triethylbenzene can be made quite simply and in good yield by heating 1,2,4-trivinylcyclohexane with an alkali metal to an elevated temperature.

The 1,2,4-trivinylcyclohexane can be made in a smooth and simple reaction by isomerizing cyclododecatriene-(1,5,9) (see German Patent No. 1,065, 413).

The alkali metal is used in an amount within the range from 1 to 20% and preferably within the range from 3 to 10% by weight based upon the weight of the 1,2,4-trivinylcyclohexane. The reaction advantageously is carried out with the addition of a promoter at atmospheric pressure or under superatmospheric pressure in an inert gas atmosphere. Organic substances which form complexes or addition compounds with alkali metals e.g. naphthalene, fluoren, alkyl and aryl halogenides as well as especially advantageously o-chlorotoluene, aniline, ethylenediamine and triethylenediamine may be used as promoters. Also alcoholates such as potassium tert.-butylate can be used as promoters. These promoters may be used in amounts within the range from 0.1 to 10% and preferably within the range from 1 to 5% by weight based upon the weight of the 1,2,4-trivinylcyclohexane. In general the reaction is carried out without added solvent.

The reaction temperature when sodium or potassium is used is within the range from 160 to 250° C. With lithium the reaction temperature is within the range from 80 to 150° C.

The reaction with sodium metal generally is carried out in the presence of o-chlorotoluene or aniline. When metallic potassium is used the process advantageously is carried out in the presence of tert.-butanol.

An especially advantageous procedure is the reaction with metallic lithium in the presence of water-free ethylenediamine. The reaction may be carried out by first preparing a 1 to 10% solution of the metallic lithium in the amine. The 1,2,4-trivinylcyclohexane is added to from 5 to 20 times as much of the solution of the lithium in the amine. It is especially advantageous to use 10 to 12 parts by weight of a 5% solution of the lithium metal in anhydrous ethylene diamine with 1 part by weight of the 1,2,4-trivinylcyclohexane.

The reaction can be carried out either batch-wise or continuously. The working up of the reaction mixutre is done by distillation preferably under subatmospheric pressure or the reaction mixture may be mixed with ice and/or water and extracted and/or distilled. The process gives pure 1,2,4-trialkylbenzenes which heretofore could be made only by an expensive separation from an isomeric mixture. The 1,2,4-trialkylbenzenes can be converted by oxidation into trimellitic acid which is of increasing technical interest for the production of polyester resins and lubricants.

*Example 1*

1944 parts by weight of 1,2,4-trivinylcyclohexane, 70 parts by weight of sodium and 60 parts by weight of o-chlorotoluene are heated with stirring in a nitrogen atmosphere for 15 hours at 190–200° C. The reaction mixture is distilled under subatmospheric pressure thereby producing 103 parts by weight of unreacted 1,2,4-trivinylcyclohexane (B.P.$_{11}$=90° C., $n_D^{20}$=1.4850), 54 parts by weight of intermediate fraction and 1337 parts by weight of 1,2,4-triethylbenzene having a boiling point of 96° C. at 12 Torr ($n_D^{20}$=1.5010). This is 72.4% of the theoretical yield based upon reacted 1,2,4-trivinylcyclohexane. 202 parts by weight of a dimerization product which probably is 2,3-di(3,6-diethyl)-phenylbutane (B.P.$_{0.05}$=128–133° C., $n_D^{20}$=1.5370) may be recovered from the distillation residue.

*Example 2*

A solution of 12.5 parts by weight of lithium in 250 parts by weight of anhydrous ethylenediamine is mixed with 20 parts by weight of 1,2,4-trivinylcyclohexane and the mixture is heated for 5 hours at 100–110° C. After cooling 500 g. of ice are added to the reaction mixture and it is then extracted with ether. The ether extract is washed with dilute hydrochloric acid and then with water, dried and distilled giving 9.5 parts by weight i.e. a 45% yield of pure 1,2,4-triethylbenzene (B.P.$_{12}$=93° C.; $n_D^{20}$=1.5009).

We claim:
1. Process for the production of 1,2,4-triethylbenzene which comprises heating 1,2,4-trivinylcyclohexane to a temperature within the range from 80° C. to 240° C. in the presence of from 1 to 20% by weight of an alkali metal and from 0.1 to 10% by weight of a promoter selected from the group consisting of aniline, ethylene diamine, o-chlorotoluene and tert. butanol calculated upon the weight of the 1,2,4-trivinylcyclohexane in an inert atmosphere.
2. Process as defined in claim 1 in which the alkali metal is sodium and the temperature is within the range from 160° to 240° C.
3. Process as defined in claim 1 in which the alkali metal is lithium and the temperature is within the range from 80° C. to 150° C.
4. Process as defined in claim 1 in which the alkali metal is sodium and the promoter is o-chlorotoluene.
5. Process as defined in claim 1 in which the alkali metal is potassium and the promoter is tert. butanol.
6. Process as defined in claim 1 in which the alkali metal is lithium and the promoter is ethylene diamine.
7. Process as defined in claim 1 in which the alkali metal is potassium and the temperature is within the range from 160° to 240° C.
8. Process as defined in claim 1 in which the alkali metal is sodium and the promoter is aniline.

References Cited in the file of this patent

Reggel et al.: J. Org. Chem., vol. 23, pages 1136–9, August 1958.
Pines et al.: J.A.C.S., vol. 77, pages 347–8, January 1955.
Pines et al.: J.A.C.S., vol. 77, pages 6314–21, December 1955.